United States Patent
Marold et al.

(10) Patent No.: US 6,598,547 B1
(45) Date of Patent: Jul. 29, 2003

(54) METHOD FOR DISPOSING OF HAZARDOUS AND HIGH-ENERGY MATERIALS AND DEVICE FOR CARRYING OUT SAID METHOD

(75) Inventors: Freimut Marold, Weil im Schönbuch (DE); Friedrich Wilhelm, Gärtringen (DE)

(73) Assignee: Eisenmann Maschinenbau KG (DE)

( * ) Notice: Subject to any disclaimer, the term of this patent is extended or adjusted under 35 U.S.C. 154(b) by 0 days.

(21) Appl. No.: 09/700,243

(22) PCT Filed: Jan. 31, 2000

(86) PCT No.: PCT/EP00/00725

§ 371 (c)(1),
(2), (4) Date: Jun. 18, 2001

(87) PCT Pub. No.: WO00/54878

PCT Pub. Date: Sep. 21, 2000

(30) Foreign Application Priority Data

Mar. 12, 1999 (DE) .......................................... 199 11 175

(51) Int. Cl.[7] ............................. F23G 5/10; F23M 5/00; A62D 3/00
(52) U.S. Cl. ...................... 110/346; 110/237; 110/243; 588/202
(58) Field of Search .................................. 110/237, 243, 110/244, 245, 250, 342, 346, 336, 165 R, 193; 588/202, 203; 122/6; 86/50; 73/35.17; 102/303; 220/560.01

(56) References Cited

U.S. PATENT DOCUMENTS

| | | | | | |
|---|---|---|---|---|---|
| 4,725,288 A | * | 2/1988 | Bougard | ......................... | 48/76 |
| 5,010,706 A | * | 4/1991 | Sauder | ......................... | 52/506 |
| 5,095,828 A | * | 3/1992 | Holden et al. | .............. | 110/250 |
| 5,154,732 A | * | 10/1992 | Hakulin et al. | .............. | 48/62 R |
| 5,353,718 A | * | 10/1994 | Warchol et al. | ............. | 110/237 |
| 5,817,198 A | * | 10/1998 | Viertola | ....................... | 156/71 |
| 5,819,673 A | * | 10/1998 | Heywood et al. | ........... | 110/346 |
| 5,958,264 A | * | 9/1999 | Tsantrizos et al. | ...... | 219/121.38 |
| 5,965,097 A | * | 10/1999 | Morlec et al. | .............. | 432/210 |
| 6,253,873 B1 | * | 7/2001 | Norres et al. | ............... | 181/224 |

* cited by examiner

*Primary Examiner*—Ira S. Lazarus
*Assistant Examiner*—K. B. Rinehart
(74) *Attorney, Agent, or Firm*—Factor & Partners

(57) ABSTRACT

The invention relates to a method for disposing of hazardous or high-energy materials, in which the latter are caused to undergo a reaction in a pressure-proof housing under controlled conditions, the end products of which reaction are non-hazardous, as well as an apparatus for disposing of hazardous or high-energy materials with a pressure-proof housing in which the materials may be caused to undergo a reaction under controlled conditions, the end products of which reaction are non-hazardous.

25 Claims, 2 Drawing Sheets

Figure 1:
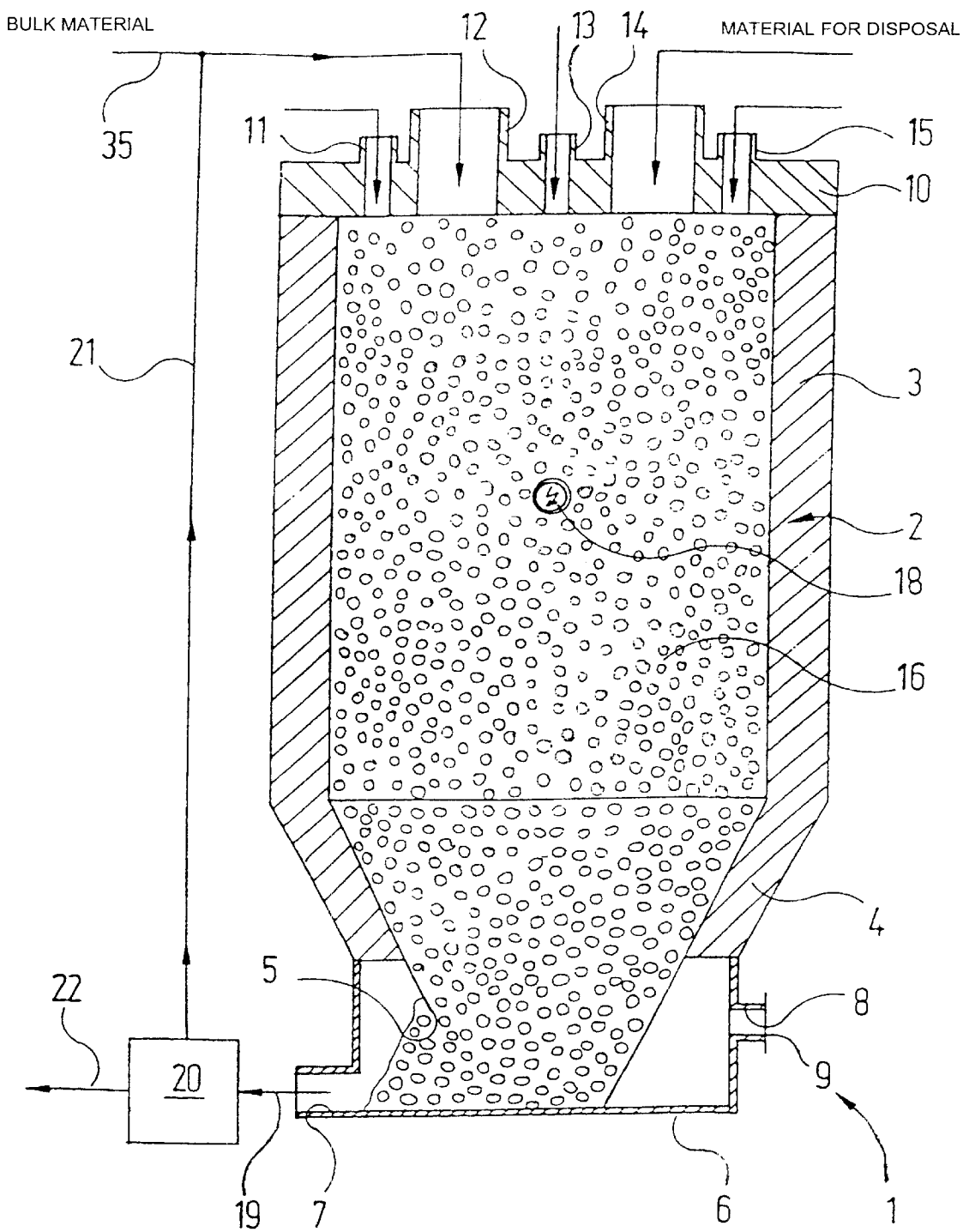

METHOD FOR DISPOSING OF HAZARDOUS AND HIGH-ENERGY MATERIALS AND DEVICE FOR CARRYING OUT SAID METHOD

The invention relates to a method for disposing of hazardous or high-energy materials, in which the latter are caused to undergo a reaction in a pressure-proof housing under controlled conditions, the end products of which reaction are non-hazardous, as well as an apparatus for disposing of hazardous or high-energy materials with a pressure-proof housing in which the materials may be caused to undergo a reaction under controlled conditions, the end products of which reaction are non-hazardous.

The "dangerous or high-energy" materials whose disposal is the aim of the present invention include in particular explosives or munitions, during the controlled explosion of which large amounts of mechanical and thermal energy are liberated. The invention is also suitable additionally, however, for the disposal of other dangerous substances which have to be converted to the desired non-hazardous end products with particular chemicals, in both exothermic and endothermic reactions.

It is known for the disposal of explosives or explosive materials to introduce the latter into a pressure-proof housing and to detonate them there in a controlled manner. An example of this is contained in WO 97/43594 A1. Disadvantageous with said known apparatuses or methods is that the disposal may take place only batch-wise and the course of the reaction is difficult to control.

The object of the present invention is to develop a method of the kind mentioned in the preamble is such a way that continuous operation is possible and the course of the reaction is easy to control.

This object is achieved according to the invention by the materials to be disposed of being mixed with a bulk material with which they together form a moving bed, wherein the reaction is initiated at a certain distance from the surface in the interior of the moving bed.

According to the invention the materials to be disposed of are therefore introduced jointly with the bulk material into the pressure-proof housing, in which a moving bed forms in the dynamic equilibrium. The latter admittedly retains its externally discernible shape substantially continuously; closer examination shows, however, that the materials of which the moving bed is formed are continuously in motion. In this way the materials to be disposed of may first of all be moved into a particular low part of the moving bed, where they are then caused to undergo a reaction. The surrounding moving bed at the same time absorbs energy which is released, in both mechanical and thermal form. The moving bed offers—where this is desired—large surfaces on which a reaction may take place. Finally, the moving bed also represents a heat store which may ensure savings on energy at all points where the materials to be disposed of have to be brought to a reaction temperature. Bulk material and materials to be disposed of may be supplied to the moving bed in the mixed state or be "scattered" onto the moving bed separately, so that the mixture forms at the earliest inside the moving bed.

If balls are used as bulk material, the required inner mobility of the moving bed is ensured particularly effectively. Deviations from the ball shape are possible, however, provided only that the degree of intrinsic friction of the bulk material is not such that the inner mobility of the moving bed is endangered.

The balls consist preferably of steel or ceramic. Both materials have the required strength to absorb mechanical or thermal energy and are in general resistant to the materials to be disposed of.

In very many cases the disposal reaction is initiated only at a particular temperature. In the most favourable case there may be set in the moving bed, without recourse to external energy and exclusively with the aid of the reaction heat, a temperature profile with which the reaction temperature is attained at a certain distance from the surface in the interior of the moving bed.

If however the materials to be disposed of are not sufficiently energy-rich to attain the reaction temperature, external heat must be supplied. This may take place in the simplest case by the supply of fuels or other ignition aids. Alternatively said heat input required for the attainment of the reaction temperature may also take place by means of an arc or inductively. In the latter case the moving bed must contain electrically conductive materials, e.g. steel balls, as bulk material.

Particularly advantageous is that development of the method according to the invention in which the bulk material is separated from the material mixture leaving the moving bed and is supplied again at least in part to the inlet of the moving bed. The consumption of the bulk material may be kept low in this way.

Auxiliaries essential for the carrying out of the method or promoting this may be supplied to the moving bed. Here are meant in particular fuels, which increase the temperature of the moving bed, air, which serves in particular for the supply of oxygen, temperature control gas, with which in particular a preliminary temperature control may take place in the area of the free surface of the moving bed, chemicals, with which the materials to be disposed of are to be reacted, and also chemisorption agents, which bind particular reaction products to themselves.

It is a further object of the present invention to develop an apparatus of the kind mentioned in the preamble in such a way that it may be operated continuously and the disposal reaction may be easily controlled.

This object is achieved according to the invention by there being formed in the housing a moving bed moving in a top-to-bottom direction in the dynamic equilibrium between the supply of a bulk material and the materials to be disposed of on the one hand and the discharge of a mixture of bulk material and residual materials arising from the reaction on the other, wherein a device is provided which ensures that the reaction is initiated only at a certain distance from the surface in the interior of the moving bed.

The advantages which are achievable with such an apparatus compared with those according to the prior art conform analogously to the advantages of the method according to the invention which were explained above. The same applies to the advantages of the embodiments of the apparatus according to the present invention.

Particularly worthy of mention at this point is the embodiment of the apparatus according to the invention as claimed in claim 18, in which the wall of the housing incorporates the following layers from the outside to the inside:

a) a pressure jacket;
b) a sound-absorbent layer;
c) an elastic layer;
d) a deformable shell of wear-resistant material supported by the elastic layer.

Said wall composition has proved to be particularly effective in coping with the complex tasks which the wall has to cope with in particular as regards the absorption of thermal and mechanical energy and also the sound dampening of noises.

The sound dampening layer may further consist of sand or wood, the elastic layer of an elastomer or a compressed fluid.

It is beneficial if temperature control ducts are passed through the elastic layer. As the result of a suitable medium flowing through said temperature control ducts, not only may reaction heat be dissipated, but in general a particular temperature profile be set in the moving bed in flow direction by cooling or heating. With hot working the inner shell may be additionally cooled, so that the higher toughness and strength of the material at lower temperatures may be exploited.

The wear-resistant (inner) shell of the wall is preferably provided with devices which permit an elastic change in diameter of the shell. The wear-resistant shell may then "breathe" for the absorption of pressure surges and in this way effectively release the mechanical energy to the elastic layer by which it is supported.

Figure 2:
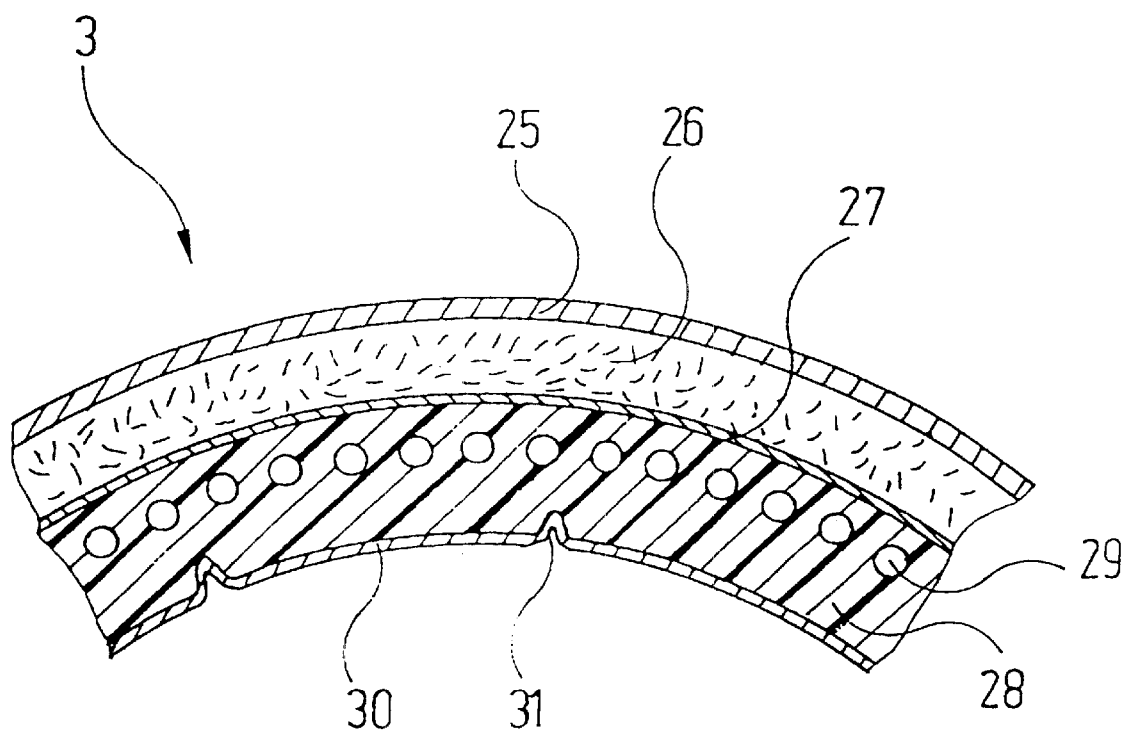

An embodiment of the invention will be explained in detail below with reference to the drawing, where FIG. 1 shows a vertical section through a shaft furnace for disposing of munitions or explosives and FIG. 2 a horizontal section through an area of the wall structure of the shaft furnace of FIG. 1.

The shaft furnace represented in vertical section in FIG. 1 and provided overall with the reference symbol 1 serves for the disposal of munitions or other explosive materials, but may also be used in a similar construction to dispose of generally hazardous or high-energy materials. It comprises a housing 2 with an upper, substantially cylindrical section 3 and a lower, discharge section 4 tapering conically in a downward direction. The discharge section 4 possesses an outlet opening 5 via which the interior of the discharge section 4 communicates with the interior of a discharge-collection housing 6. In the vicinity of the bottom of the discharge-collection housing 6 is located a discharge opening 7; at a somewhat greater distance from the bottom of the discharge-collection housing 6 there is provided a gas inlet and outlet opening 8. The latter is sealed by a flange 9 in FIG. 1.

On the cylindrical section 3 of the housing 2 is positioned a lid-type housing upper part 10, in which various inlet openings 11, 12, 13, 14 and 15 are located.

Via the inlet opening 12 there is supplied to the interior of the housing 2 in a manner to be described in greater detail a bed of steel balls, which, when the shaft furnace 1 is in the operationally ready state, fills in the manner shown in FIG. 1 a part of the discharge-collection housing 6, the whole of the conical discharge section 4 and the whole of the cylindrical section 3 of the housing 2. The steel balls are further so dimensioned that they form within the housing 2 a "flowable" bed 16 after the manner of a wall bed.

At a certain distance below that surface of the moving bed 16 which is adjacent to the inlet opening 12 there is provided an ignition device 18, for example in the form of two electrodes generating an arc.

The munitions to be disposed of are fed through the inlet opening 14 in the housing upper part 10. These, at the same time, mix with the steel balls introduced via the inlet opening 12 and move together with the latter, integrated into the moving bed 16, within the shaft furnace 1 in a downward direction, as will be explained further below.

Via the inlet openings 11, 13 and 15, shown with a smaller diameter, in the housing upper part 10 there may be introduced into the interior of the housing 2, according to requirement, auxiliaries such as for example water, fuels, air, hot gas, cooling gas and chemicals, in particular chemisorption agents, depending on the nature of the materials which are to be disposed of in the shaft furnace 1. Inlet openings 11, 13, 15 not required will naturally be sealed when the shaft furnace is in operation.

The discharge opening 7 of the discharge-collection housing 6 is connected via a line 19 and a bulk material separation device 20, as well as a further line 22, to a discharge device (not shown in the drawing). The latter withdraws via the line 19 the material located in the discharge-collection container 6, which is a mixture of the steel balls used as bulk material (moving bed material) and the scrap and other residual materials which are obtained during the reaction of the material for disposal. In addition, the whole of the interior of the housing 2 is simultaneously kept under vacuum for example by exhaustion via the line 8, so that no gases may escape out of the housing 2.

In the bulk material separation device 20 the bulk material is separated from the other residual materials, in particular the scrap. The bulk material is supplied again via a further line 21 to the inlet 12 in the housing upper part 10, while the scrap and the other solid residual materials arising out of the reaction may be supplied harmlessly via the line 22 to the final disposal point.

The shaft furnace 1 described above operates as follows:

Due to the continuous supply of steel balls via the inlet opening 12 in the housing upper part 10 and the withdrawal of steel balls taking place on the same scale via the discharge opening 7 in the discharge-collection housing 6, and also to the recycling via the line 21 of the steel balls recovered in the bulk material separation device 20, a continuous circulation of the steel balls is maintained. Only the particular supplement of fresh steel balls required on each occasion is introduced from outside via the line 35. There forms in the interior of the reactor the moving bed 16 shown in FIG. 1, which in the dynamic equilibrium of inflow 17 and outflow retains roughly the shape shown. The goods to be disposed of, in the example the munitions, are fed in a suitably co-ordinated amount via the inlet opening 14 in the housing top part 10 and at the same time mixed with the steel balls. In the vicinity of the inlet openings 12 and 14 17 (sic) the moving bed 16 possesses a temperature which lies below the ignition temperature of the munitions. The deeper, however, the munitions sink downwards in the moving bed 16 together with the steel balls, the higher becomes the temperature to which they are exposed. If the munitions come into the vicinity of the ignition device 18, they already have a temperature which is not far removed from the ignition temperature. A relatively small further increase in temperature as a result of the ignition device 18 then suffices to initiate the controlled explosion. The thermal and mechanical energy thereby released is absorbed by the steel balls surrounding the munitions and in part passed along against the walls 3 of the housing 2, which are to this end constructed in a particular manner explained in further detail below. The reactions connected to the explosion and in some cases following it are completed when the materials forming the moving bed 16 enter the lower discharge section 4 of the housing 2. Therefore, the moving bed 16 contains here substantially steel balls, metal scrap, which has arisen out of the metallic munition parts during the explosion, non-hazardous chemicals as reaction products and in some cases gases. Said mixture is discharged via the discharge-collection housing 6 in the manner already described above, wherein any gases present are drawn off via the gas inlet/outlet opening 8.

The moving bed 16 not only has a damping effect on pressure surges in the case of the operations described above; rather the steel balls recirculated via the bulk material separating device 20 and the line 21 serve simultaneously as a regenerative heat exchanger or heat store. The latter reduces the energy requirement which is required to heat the munitions up to close to the ignition temperature.

The bulk material separation device 20 may be of various types of construction: in the case described above, in which the bulk material consists of steel balls and the scrap obtained in the explosion consists substantially of iron, it may operate magnetically.

Instead of balls of steel, balls of other material may also be used as bulk material, in particular ceramic balls. An exact ball shape is also not essential; any shape is sufficient which leads to the desired "flowable" moving bed 16.

If a metal is used as the material for the bulk material, an induction coil may also be employed, in place of the ignition device 18 operating with an arc. This produces heat-generating eddy currents in the bulk material, which currents then guarantee the temperature required to initiate the reaction. In the case of energy-rich materials it is possible in certain circumstances to dispense with a separate ignition device completely, since the temperature required to initiate the reaction is attained out of the reaction heat in the moving bed 16 without external energy input.

As has already been mentioned above, the wall 3 of the housing 2 has to withstand considerable thermal and mechanical stresses; in addition, the reactions taking place in the moving bed 16 may be combined with a considerable noise level, so that a sound dampening property of the wall 3 is desirable. To this end the wall 3 possesses the composition shown diagrammatically in FIG. 2:

There is located radially within an outer, conventional pressure jacket 25 of metal a sound-absorbent intermediate layer 26, which may consist e.g. of sand or wood. The sound-absorbent intermediate layer 26 is separated by a metallic layer 27 from a further intermediate layer 28, which consists of an elastic medium, in the example shown of rubber. The elastic intermediate layer 28 is perforated by a multiplicity of axially parallel temperature control bores 29. Through said temperature control bores 29 is passed, depending on requirement, a temperature control means (cooling medium or heating medium), which is necessary to maintain a particular temperature in a particular section of the housing 2.

The most inwardly lying layer of the wall 3 in radial direction is a wear-resistant shell 30, which by virtue of its inherent elasticity is deformable and by virtue of axially parallel beadings 31 may "breathe" in the sense that it may change its diameter under the influence of inner pressure surges. The wear-resistant shell 30 is further supported on the elastic intermediate layer 28, which in the last analysis absorbs the deformation energy.

What is claimed is:

1. A method for disposing of hazardous or high-energy materials, in which the latter are caused to undergo a reaction in a pressure-proof housing under controlled conditions, the end products of which reaction are non-hazardous,
wherein
a bed of bulk material is provided which moves continuously through said pressure-proof housing in dynamic equilibrium of inflow and outflow;
the materials to be disposed of are mixed with the bulk material at a first place where the temperature lies below the ignition temperature of the materials to be disposed; and
the materials to be disposed wander within the bulk material to a second place of higher temperature where ignition is initiated such that ignition takes place at a certain distance from said first place.

2. A method as claimed in claim 1, wherein balls are used as bulk material.

3. A method as claimed in claim 2, wherein the balls consist of steel.

4. A method as claimed in claim 2, wherein the balls consist of ceramic.

5. A method as claimed in claim 1, wherein the reaction is initiated by external heat input.

6. A method as claimed in claim 5, wherein the external heat input takes place by means of lost ignition aids.

7. A method as claimed in claim 5, wherein the external heat input takes place by means of an arc.

8. A method as claimed in claim 5, wherein the bulk material is electrically conductive and the heat input takes place inductively.

9. A method as claimed in claim 1, wherein the bulk material is separated out of the material mixture leaving the moving bed (16) and is supplied again at least in part to the inlet of the moving bed (16).

10. A method as claimed in claim 1, wherein auxiliaries are supplied to the moving bed.

11. An apparatus for disposing of hazardous or high-energy materials with a pressure-proof housing having an exterior in which the materials may be caused to undergo a reaction under controlled conditions, the end products of which reaction are non-hazardous,
wherein
there is formed in the housing (2) a moving bed (16) moving continuously in a top-to-bottom direction in the dynamic equilibrium between the supply of a bulk material and the materials to be disposed of into a top portion of the housing and the discharge of a mixture of bulk material and residual materials arising from the reaction from a bottom portion of the housing, wherein the housing and the moving bed, at any one point in time, together have a first place located near the top portion of the housing, and a second place located a certain distance below the first place, such that the first place is at a lower temperature than the second place, and the second place is at a temperature sufficient for ignition of the hazardous or high-energy materials by which a device (18) is provided which ensures that the reaction is initiated only at a certain distance from the first place of the moving bed (16).

12. An apparatus as claimed in claim 11, wherein beneath a surface of the moving bed (16) an ignition device (18) is provided.

13. An apparatus as claimed in claim 12, wherein the ignition device (18) incorporates electrodes between which an arc may be generated.

14. An apparatus as claimed in claim 12, wherein the ignition device (18) incorporates an induction coil with which the moving bed (16) may be heated inductively.

15. An apparatus as claimed in claim 11, wherein a cooling device is provided with which the temperature profile in the moving bed (16) is adjustable in flow direction.

16. An apparatus as claimed in claim 11, wherein the apparatus incorporates a bulk material separation device (20) to which the material mixture leaving the moving bed (16) is suppliable and which separates the bulk material from the latter, wherein the bulk material outlet of said bulk material separation device (20) is connected to the bulk material inlet (12) of the housing (2).

17. An apparatus as claimed in claim 11, wherein the housing (2) comprises at least one additional inlet (11, 13, 15) for the supply of auxiliaries.

18. An apparatus as claimed in claim 11, wherein a suction device is provided which keeps the interior of the housing (2) under vacuum.

19. An apparatus as claimed in claim 11, wherein a wall (3) of the housing (2) incorporates the following layers from an outside portion to an inside portion of the wall:
   a) a pressure jacket (25);
   b) a sound-absorbent layer (26);
   c) an elastic layer (28);
   d) a deformable shell (30) of wear-resistant material supported by the elastic layer (28).

20. An apparatus as claimed in claim 19, wherein the sound-absorbent layer (26) consists of sand.

21. An apparatus as claimed in claim 19, wherein the sound-absorbent layer consists of wood.

22. An apparatus as claimed in claim 19, wherein the elastic layer (28) consists of an elastomer.

23. An apparatus as claimed in claim 19, wherein the elastic layer (28) consists of a compressed fluid.

24. An apparatus as claimed in claim 19, wherein temperature control channels (29) are passed through the elastic layer (28).

25. An apparatus as claimed in claim 19, wherein the wear-resistant shell (30) is provided with devices (31) which permit an elastic change in diameter of the shell (30).

* * * * *

UNITED STATES PATENT AND TRADEMARK OFFICE
CERTIFICATE OF CORRECTION

PATENT NO.    : 6,598,547 B1
DATED         : July 29, 2003
INVENTOR(S)   : Marold et al.

It is certified that error appears in the above-identified patent and that said Letters Patent is hereby corrected as shown below:

Column 6,
Line 29, delete "exterior" and insert instead -- interior --.

Signed and Sealed this

Second Day of December, 2003

JAMES E. ROGAN
*Director of the United States Patent and Trademark Office*